United States Patent [19]

Hoon, Jr.

[11] 3,823,924
[45] July 16, 1974

[54] FILTER DEVICE
[75] Inventor: Harry E. Hoon, Jr., Strongsville, Ohio
[73] Assignee: Envirotech Corporation, Salt Lake City, Utah
[22] Filed: June 21, 1972
[21] Appl. No.: 264,809

[52] U.S. Cl. ................................................. 261/94
[51] Int. Cl. ........................................... B01d 47/00
[58] Field of Search ...................................... 261/94

[56] References Cited
UNITED STATES PATENTS
3,364,656   1/1968   Whiton et al. ..................... 261/94
3,543,937   12/1970  Choun ............................. 210/150
FOREIGN PATENTS OR APPLICATIONS
258,274    10/1970  U.S.S.R. ......................... 261/94

Primary Examiner—Bernard Nozick
Attorney, Agent, or Firm—Robert E. Krebs; Thomas S. MacDonald

[57] ABSTRACT

A filter unit for use in an apparatus for intercontacting fluid streams and comprising a hollow perforated spherical member of polymeric plastic material having a solid spherical member disposed therein and freely movable with respect thereto. As applied to a separator in a dust collecting system the units are disposed within a bed of water flowing downwardly in the separator and are also subjected to a current of dust laden air moving upwardly through the bed and contacting the units. In such environment the units move upwardly through the bed of water under the action of the current of air until they reach the surface, where they become filled with water and then drop to the bottom of the bed of water where the water flows out and the cycle is repeated. Such movement of the units aids in the removal of material from the dust laden air.

2 Claims, 4 Drawing Figures

PATENTED JUL 16 1974

3,833,924

FILTER DEVICE

BACKGROUND OF THE INVENTION

The present invention is an improvement on the invention by the present applicant, as illustrated, described and claimed in U.S. application Ser. No. 135,586, filed Apr. 20, 1971 now U.S. Pat. No. 3,758,087. In such application the filter embodied a plurality of hollow perforated spheres of polymeric plastic material immersed in a bed of water in a tower for the countercurrent contacting of gas and liquid streams. In operation, the spheres would partake only of a slight undulating movement while remaining at substantially the same horizontal level. The specific gravity of each such spherical member determined the maximum rate of air flow into the separator, and if such rate were exceeded, the spheres would be forced out of the bed of water by the air current and would not then be effective in removing material from the gas stream. If, however, the rate of air flow could be increased without causing the spheres to leave the bed of water, the efficiency of the separator could be greatly increased.

SUMMARY OF THE INVENTION

The present invention overcomes the foregoing difficulty by providing a means and method whereby the specific gravity of the sphere can be increased in accordance with the rate of increase of the gas stream. This has been accomplished by inserting a solid sphere such, for example, as a ceramic sphere within the hollow perforated outer sphere of polymeric plastic material and utilizing a solid sphere of such size and weight as to attain a unit of desired specific gravity.

The invention also includes a method of making the unit by inserting a solid sphere within a hemisphere of polymeric plastic material, then enclosing the solid sphere by uniting such hemisphere to another hemisphere of polymeric plastic material, and joining them together along planar surfaces which are formed adjacent the circular periphery of each hemisphere.

The invention has produced a new action to the spheres in that they rise slowly to the surface of a bed of water at which time they become filled with water and sink slowly to the bottom where the water flows out of the unit and the action is then repeated. It has been found that such action has greatly increased the amount of material which can be removed in a unit for time from the stream of gas.

DESCRIPTION OF THE PREFERRED EMBODIMENT

Figure 1:
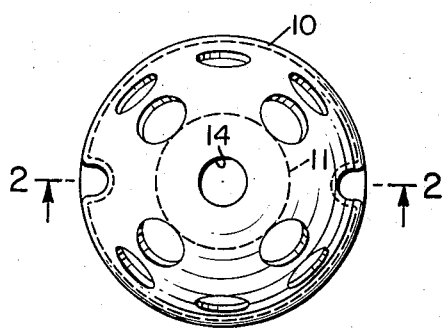
FIG. 1 is an elevational view of a preferred embodiment of the contact article of the present invention.
Figure 2:
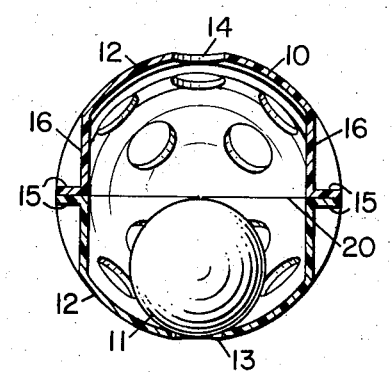
FIG. 2 is a vertical section taken on a plane indicated by the line 2—2 of FIG. 1.

Referring to FIGS. 1 and 2, one form of the invention embodies a hollow perforated sphere 10 of polymeric plastic material which encloses a solid sphere 11, preferably of ceramic material. The outer sphere may be formed by joining together two hemispherical units 12 along a median plane 20 of the sphere. In the form of FIGS. 1 and 2 each hemisphere has planar surfaces 15 extending inwardly from the outer surface of the sphere and such surfaces comprise the bottom of a recess 16 formed within the confines of the spherical contour. The perforations or openings as shown are circular in configuration and are spaced symmetrically around the outer sphere with one such opening designated 13 at the bottom and another designated 14 at the top. Preferably, the openings are arranged in an array of 11 holes per hemisphere.

The invention also includes a method of making the article by enabling an operator to insert the solid sphere within one of the hemispheres and then bringing the other hemisphere into contact with the first hemisphere along the median plane 20 and with the planar surfaces 15 in contact with each other. The recesses 16 then enable the operator to apply heat and pressure against the outer faces of the planar surfaces and thereby to unite the hemispheres together and to enclose the solid sphere.

As shown in the drawings, the diameter of the solid sphere is at most about half the diameter of the outer sphere and is freely movable with respect thereto. The size and weight of the solid sphere, however, will determine the ultimate specific gravity of the unit and may be varied in accordance with the rate of flow of the gas to which the filter is to be subjected in use. As an example, it has been found that by utilizing a hollow outer sphere of 1-11/16 inches outer diameter and weighing 1 ounce, together with a solid sphere having 58 inches diameter and weighing 1 ounce in a separator with a water rate of 3 to 4 gallons per minute per 1,000 cubic feet of discharged saturated air and with an 18 inch depth of spheres, the velocity of air flow into the separator has been increased from about 500 feet per minute to about 750 feet per minute without causing any of the spheres to leave the bed of water.

Figure 3:
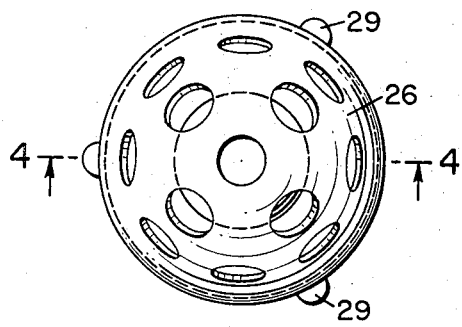
FIG. 3 is an elevational view of a modification of the article of the present invention.
Figure 4:
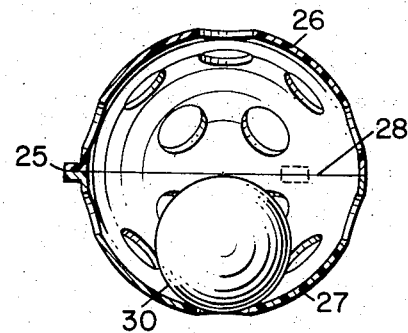
FIG. 4 is a vertical section taken on a plane indicated by the line 4—4 in FIG. 3.

A modified form of the invention is illustrated in FIGS. 3 and 4 wherein the planar surfaces 25 of the hemispheres 26 and 27 extend outwardly at the median plane 28 either in the form of tabs 29 or in the form of flanges which extend entirely around the sphere. Such form of construction enables the hemispheres to be joined together by the application of heat and pressure against the planar surfaces, without necessitating the use of recesses which extend inwardly from the hemispheres, as shown in FIGS. 1 and 2. In such modified construction the solid sphere 30 is inserted within one of the hollow perforated outer hemispheres, and then the other hemisphere is joined to it.

A filter unit constructed in accordance with the present invention partakes of a different action within a bed of water from that which occurs when the filter units comprise only perforated hollow spheres of polymeric plastic material. In the case of the latter construction the spheres partake only of a relatively slight undulating motion within the bed of water, whereas in the former construction the spheres rise to the surface of the bed of water where they are filled with water and then sink to the bottom. Upon arriving at the bottom the water empties out and the cycle is repeated. It is believed that such action is the result of the inner sphere seating against the periphery of an opening in the outer sphere where it functions to deflect the flow of water through the sphere. Such vertical rising and falling subjects the spheres to a longer period of contact with the current of air and thereby accomplishes a greater removal of material which is carried into the collector by the gas stream.

I claim:

1. In an apparatus for cleaning a contaminated gaseous stream by counter-currently contacting the gaseous stream with a liquid stream through a loosely confined bed of generally spherical contact articles, said articles each comprising:
   a. a pair of similarly sized hollow hemispheres made of perforated polymeric material;
   b. each of said hemispheres including spaced-apart tab portions which extend inwardly from the equatorial edge of the hemisphere substantially coplanar with that equatorial edge, said tab portions being arranged on one of said hemispheres of said pair in a pattern which is symmetric with the arrangement of tabs on the other said hemisphere;
   c. said pairs of said hemispheres being joined to form a sphere with associated pairs of said tabs juxtaposed within the general peripheral confines of the article;
   d. each of said hemispheres further including recesses which are formed into the walls thereof and which are associated with each of said tabs, said recesses extending generally perpendicular to the plane of the tabs; and
   e. a solid spherical member disposed to move freely within the sphere formed from said perforated hemispheres, said solid sphere having a density greater than the density of water.

2. An apparatus according to claim 1 wherein the diameters of said solid spherical members are less than the radiuses of the outer spherical members.

* * * * *